Figure 1:
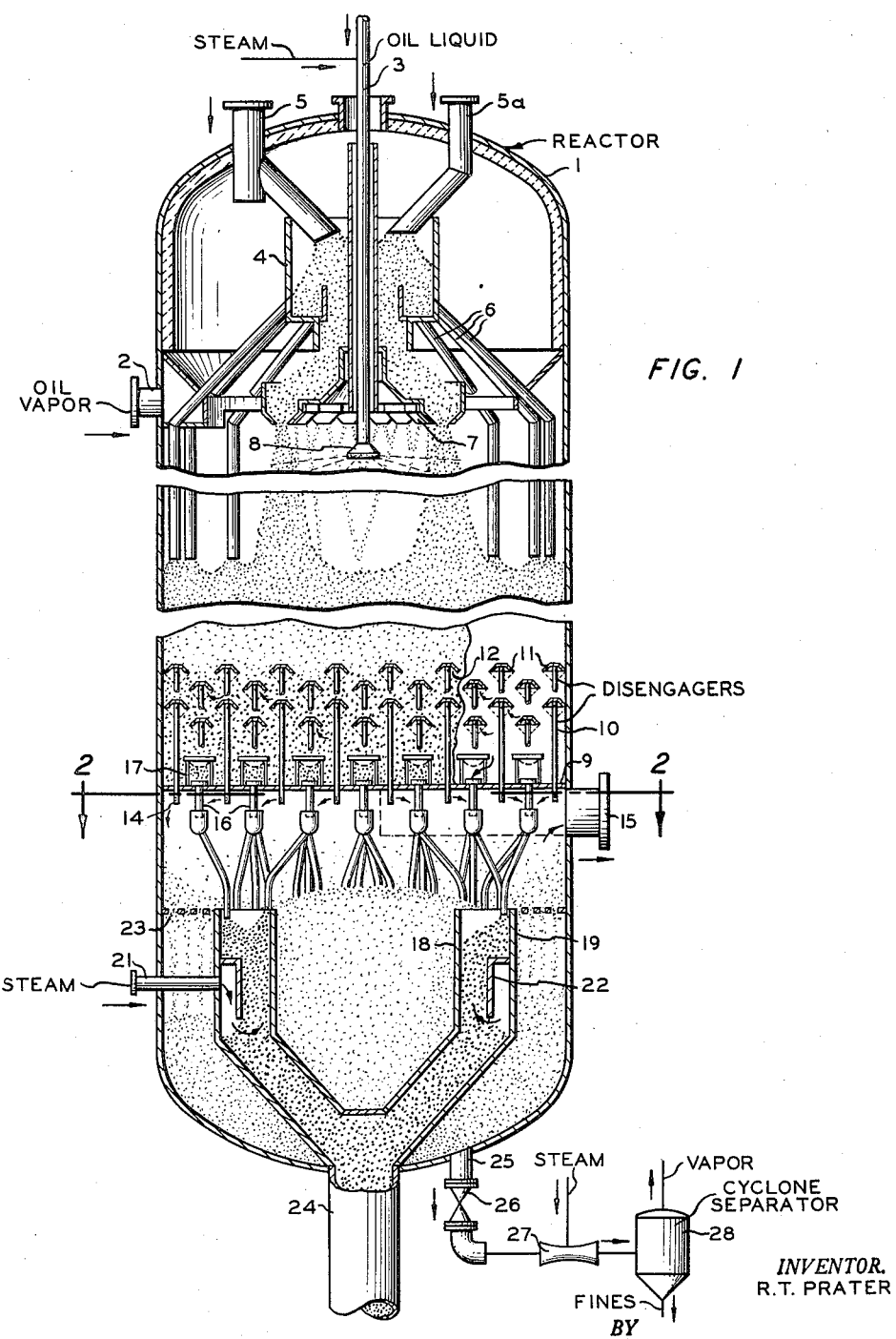

INVENTOR.
R.T. PRATER
BY
Hudson & Young
ATTORNEYS

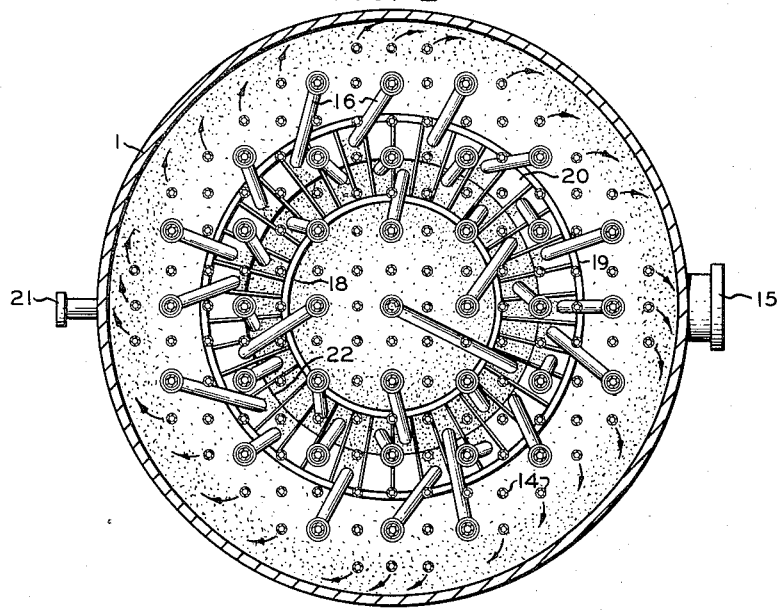
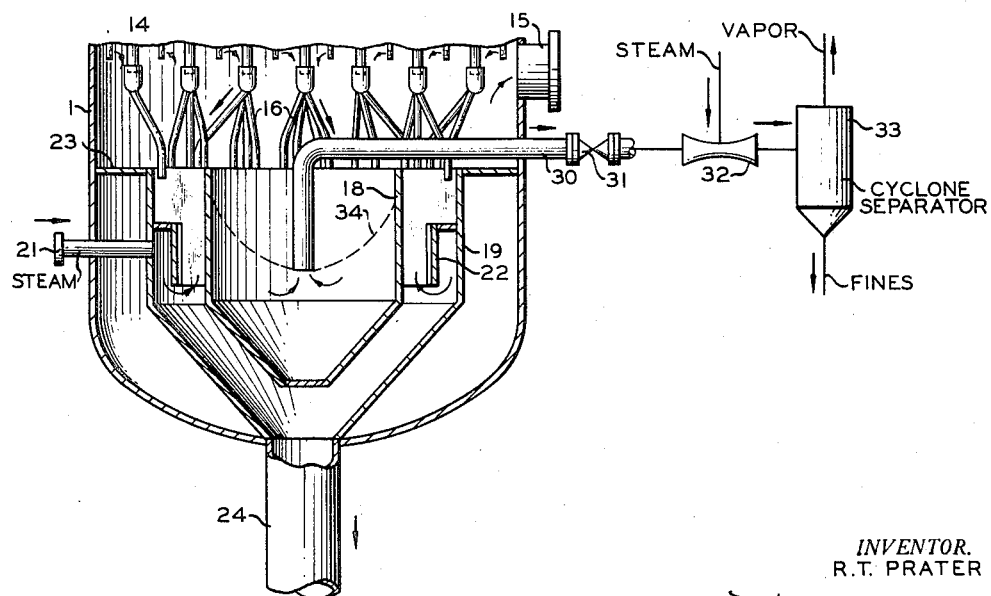

United States Patent Office 2,893,949
Patented July 7, 1959

2,893,949

MINIMIZING CATALYST FINES CARRYOVER IN A HYDROCARBON CONVERSION UNIT

Robert Theodore Prater, Okmulgee, Okla., assignor to Phillips Petroleum Company, a corporation of Delaware Application February 28, 1955, Serial No. 490,771

14 Claims. (Cl. 208—150)

This invention is directed to a means and method for reducing the catalyst fines carryover in the effluent vapor stream from a hydrocarbon conversion system. More specifically it is directed to a method and means for reducing catalyst fines carryover from a catalytic cracking unit.

One of the conventional methods of hydrocarbon conversion utilizes the catalysts in the form of a downwardly moving compact bed. Usually the feedstock vapors flow countercurrently to the catalyst mass although it is not uncommon to employ concurrent flow of vapors and catalysts as shown, for example, by U.S. 2,439,348. Exemplary of the hydrocarbon conversion which may be conducted by this method and apparatus are the catalytic dehydrogenation, hydroforming, desulfurization, coking, and cracking of hydrocarbon fractions. Following the conversion step, the catalyst particles pass through a regeneration zone similar to the reactor and in contact with a combustion-supporting gas, usually air, to burn off carbonaceous materials deposited thereon during the conversion step. In such a cyclic process the constant abrasion of the catalyst particles as they slide over each other and past the vessel walls results in the formation of catalyst fines. Unless removed beforehand, a portion of these fines becomes entrained in the hydrocarbon vapor effluent from the reactor and hence pass into the product recovery equipment, such as the fractionating and condensing apparatus. Here they settle out wherever the vapor stream is slowed down, e.g., in meters, pumps, gages, etc. In addition to the plugging action which this causes, the abrasive action of the fines on these elements shortens their useful life.

This invention has for its principal object the removal of catalyst fines from a hydrocarbon conversion reactor in such a manner as to prevent their entrainment in the effluent gases. A more specific object is the provision of a method and means for removing such fines from a catalytic cracker.

The invention can best be illustrated by referring to the accompanying drawings wherein Figure 1 represents a vertical cross section of a cataytic cracker and illustrates one modification of the fines recovery system of this invention; Figure 2 is a plan view of the reactor's stripping section taken along cutting plane 2—2 of Figure 1; and Figure 3 illustrates a vertical section of the lower portion of the reactor and a second modification of the fines recovery system.

Referring to Figure 1, catalytic cracker 1 is charged with a stream of vaporized feedstock such as gas oil through line 2 and a mixture of liquid feedstock and superheated steam enters the top of the reactor through line 3. Of course, a combined liquid-vapor feedstock could be used. Catalyst is charged to distributor 4 through conduits 5, 5a and discharges through the outer peripheral circle of distributor pipes 6 and through the inner circle of distributor outlets 7. The inner circle surrounds the downwardly directed spray of liquid feedstock discharged through nozzle 8 in line 3, forming a cylindrical curtain to prevent the spray from splashing on the reactor walls and coking there. At the outlet of the distributor pipes 6, the catalyst forms a compact bed supported by a horizontal grid plate 9. A plurality of spaced vapor disengager tubes 10 extend through grid 9 with their lower ends terminating a short distance below it. Each disengager is covered by an inverted cup-shaped member 11 or angle iron which acts as an umbrella, permitting the vapors, along with some catalyst fines, to be drawn in through orifices 12 without obstruction from the main catalyst mass. Disengagers 10 are notched near their base to form discharge ports 14 through which vapors are discharged into the vapor space below the grid for passage through effluent nozzle 15 to suitable fractionating means not shown.

Catalyst is drawn off from the catalyst bed into the underlying stripping section through a plurality of downcomer pipes 16. Downcomers 16 are partly covered by members 17 to provide a funneling action for the passing of catalyst particles thereto and to prevent bridging of the catalyst bed over the tops of the downcomers.

The stripping section consists mainly of two concentric hoppers 18 and 19, the intervening space being divided into a number of cells 20 (Figure 2). Each catalyst downcomer pipe 16 discharges into an individual cell as shown in Figure 2. Inner hopper 18 tapers to a conical base as does hopper 19, the latter discharging into standpipe 24 for passage into the regeneration zone. Catalyst particles pass through the cells 20 as a plurality of compact columns and are stripped therein by steam entering the reactor through line 21 and discharging into hopper 19. Baffle ring 22 projecting from the inner wall of cylinder 19 forces the incoming steam downwardly and toward the center of cells 20; from this point it flows up through the individual cells. Stripped catalyst is withdrawn from the reactor into standpipe 24. The fines, together with stripped hydrocarbon vapors, are entrained by the stripping steam passing through the several cells and collect, in part, within inner hopper 18.

Catalyst fines also build up in the annular space between hopper 19 and the kiln wall. This space is conveniently drained through conduit 25. Conduit 25 is valved at 26 and connected into steam eductor 27 which sucks fines from the reactor into the cyclone separator 28 wherein solid-vapor separation is effected, the vapor passing overhead and the fines being discarded at the base. The solids and vapor streams may be disposed of as desired. This fines discharge unit is operated only when the level of fines in the aforesaid annular space builds up to the point where it threatens to be carried over into the effluent nozzle 15. At this point valve 26 is opened and the steam to eductor 27 turned on so as to pull out the accumulated fines. When this is finished, valve 26 is closed and the steam to eductor 27 shut off. Automatic operation of the unit is possible, of course, by using a suitable fluids level control or feeler mechanism to turn on the eductor unit when the fines level reaches a certain point and to turn it off when the level falls below said point.

In order to effect maximum collection of catalyst fines in the annular space adjacent the kiln wall, discharge ports 14 in disengagers 10 are turned so as to discharge the vapor centrifugally toward the vessel walls and at an angle calculated to give a swirling motion of the gases along the walls. These gases entrain fines carried upwardly by the stripping steam from cells 20 and swirl them in a circular path around the periphery of the vessel, the particles dropping down along the vessel walls. Supporting shelf 23 which braces the top of hopper 19 is perforated to allow the precipitated fines to drop into the annular space around hopper 19 for removal through conduit 25 as described above.

In a typical embodiment, vapor outlets 14 would be turned at about a 45° angle toward the vessel wall as shown in Figure 2 so as to effect a clockwise movement of the gases and entrained fines along the wall of the reactor. However, these outlets may be oriented to give counterclockwise circulation. Either circulation produces the desired results. In addition, nozzle 15 may be extended toward the center of the vessel 1 as indicated in Figure 1. This has the effect of further reducing the fines carryover since it enables gases to be vented from the center of the vessel while the fines are being drawn to the periphery thereof.

Figure 3 illustrates another embodiment of the invention wherein disengager outlets 14 are directed toward the center of the vessel 1 so as to collect within hopper 18. A fines discharge unit similar to that shown in Figure 1 is used to pull fines from this accumulation, the unit consisting of suction pipe 30, valve 31, steam eductor 32, and cyclone separator 33. The operation of this unit is the same as that described above in connection with Figure 1. The normal angle of repose of the fines in hopper 18 indicated at 34 keeps accumulated fines sliding into the base of the suction pipe 30 and eliminates the possibility of the fines mass bridging at some point around the vertical section of the pipe and leaving a fixed void at the inlet end. In this embodiment of the invention the shelf 23 supporting hopper 19 is made solid, instead of being perforated as in Figure 1, so as to prevent fines from falling into the annular space around hopper 19.

While I have illustrated and described specific forms of the invention in the drawings and specification, it is to be understood that these are illustrative, not limiting, and that various modifications may be made without departing from the spirit of the invention.

I claim:

1. In a hydrocarbon conversion process wherein catalyst gravitates as a compact moving bed through a reaction zone and an underlying stripping zone, spent catalyst is withdrawn from the stripping zone, product vapors admixed with stripping gas are withdrawn as effluent from a vapor space between the aforesaid zones, and catalyst fines tend to become entrained in said effluent and be withdrawn therewith from the system, the improvement comprising introducing said product vapors from said reaction zone into said vapor space in such a manner as to impart a predetermined uniform swirling motion to the mixture of said product vapors and stripping gas with respect to the periphery of said vapor space to effect precipitation of the major portion of said fines and cause them to deposit in a selected locale below said vapor space separate from said spent catalyst, separately withdrawing the resulting deposited precipitated fines from the system, and separately withdrawing said spent catalyst from the system.

2. In a hydrocarbon converson process wherein catalyst is withdrawn from a reaction zone as a plurality of compact columns of downwardly moving particles, an inert stripping gas is admitted to the base of each column and withdrawn from the surface thereof, said withdrawn stripping gas normally containing entrained catalyst fines, spent catalyst is withdrawn from the system, and effluent comprising product vapors and said withdrawn stripping gas are removed from the system, the improvement comprising directing the flow of product vapors from said reaction zone into said withdrawn stripping gas in such a manner as to impart a predetermined uniform swirling motion to the mixture of said product vapors and withdrawn stripping gas to effect precipitation of the major portion of said fines and cause them to be deposited in a selected locale separate from said spent catalyst, and separately withdrawing the resulting deposited precipitated catalyst fines from the system.

3. In a process of continuously catalytically cracking petroleum hydrocarbons in the presence of particle-form cracking catalyst wherein the catalyst gravitates successively through a conversion zone and a lower stripping zone as a compact column of particles, stripped catalyst is withdrawn from said stripping zone, the feedstock is passed under cracking conditions concurrently with the catalyst through said conversion zone, the cracked product in gaseous form is separated at a plurality of points from the base of the reaction zone and removed from a vapor space at a level intermediate said points and the top of the underlying stripping zone, and stripping gases containing entrained catalyst fines are withdrawn from the stripping zone and combined with the cracked product in said vapor space, the improvement comprising directing the said stream of cracked product downwardly into the stripping gases in said vapor space at a predetermined angle with respect to the periphery of said vapor space necessary to set up a predetermined and uniform swirling motion in the gaseous mixture in said vapor space, whereby entrained fines are precipuitated from the effluent gases before said gases are vented from the system and the resulting precipitated fines are caused to be deposited in a selected locale separate from said stripped catalyst, and perodically discharging said deposited fines from the system at a point separate from the point of effluent withdrawal.

4. In a hydrocarbon conversion system wherein the catalyst gravitates through the reactor as a single compact column of particles, feedstock is passed concurrently through said column, vaporous conversion products are separated from the lower portion of the catalyst bed as a plurality of downwardly moving streams and discharged into a vapor space beneath said bed, fouled catalyst is independently drained from the base of the column at a plurality of points and distributed into a plurality of vertical cells spaced in a circle around the central axis of the reactor and below said vapor space, stripping gas is introduced from a common header into the base of each cell and withdrawn from the top thereof, the combined stripping effluent in admixture with the hydrocarbon conversion products is removed from the vapor space to suitable gas separation means, and wherein catalyst fines become entrained in the stripping gases and tend to be carried over into the hydrocarbon conversion products, the improvement comprising directing the several streams of conversion products downwardly into the stripping gases in the vapor space at a predetermined angle with respect to the periphery of said vapor space so as to impart a predetermined, uniform swirling motion to the gaseous mixture in the vapor space, whereby the bulk of the entrained fines are precipitated and deposited in a selected locale of said reactor, separate from said fouled catalyst, and periodically withdrawing the accumulated deposited fines from the system.

5. Process of claim 4 wherein the conversion gases are directed toward the area within the circle of cells, whereby entrained fines are precipitated within said circle.

6. Process of claim 4 wherein the streams of conversion vapors are directed toward the periphery of the reactor and at a sufficient angle from the normal to impart a centrifugal swirling motion to the gases, whereby the catalyst fines are centrifuged to the periphery of the reactor and settle out on the outside of the cell arrangement.

7. In a hydrocarbon conversion unit comprising a vertically elongated vessel, means for admitting catalyst particles and feedstock to the upper portion of the vessel, a reactor section below said latter means supported by a horizontal partition extending entirely across the vessel, vapor disengagers extending vertically through said partition and terminating at their upper ends a short distance above said partition and terminating at their lower ends a short distance below said partition in a vapor space, catalyst stripping means within the lower portion of the vessel, and a catalyst discharge orifice at the base of the vessel, in combination, means defining discharge ports in said lower ends of said disengagers, said ports having a predetermined angle of discharge with respect to the periphery of said vapor space and adapted to facilitate the precipitation of entrained catalyst fines from the gaseous mixture in said vapor space and cause them to be deposited in a selected locale of said vessel below said vapor space, and a conduit extending through the wall of said vessel and designed to withdraw the resulting deposited fines from said selected locale.

8. Apparatus of claim 1 wherein the conduit for fines removal is equipped with suction means to expedite the removal of fines therethrough.

9. In an apparatus for the conversion of hydrocarbons in the presence of a compact moving bed of particle-form solid catalyst comprising a vertically elongated vessel closed at each end, means for admitting catalyst and feedstock to the upper portion of said vessel, a horizontal plate within the lower portion of the vessel to support the weight of said bed, a vapor space below said plate, a vapor discharge port in the vessel below said plate and in communication with said vapor space, stripping means in the lower portion of the vessel below said vapor space and designed to discharge stripping gases into said vapor space, means for independently draining catalyst particles from the bed above said plate into said stripping means, and means for withdrawing stripped catalyst from said stripping zone, in combination, a plurality of substantially vertical disengager conduits extending through said plate at a plurality of points to disengage vaporous conversion products from said catalyst bed and to discharge them into said vapor space, said conduits being hooded over their upper ends to deflect catalyst particles and being notched at their lower ends to direct the vapor discharge therefrom toward a selected point, whereby said vapor discharge may be jetted into the stripping gases in said vapor space at a predetermined angle with respect to the periphery of said vapor space so as to precipitate the fines entrained in said stripping gases and deposited said fines in a selected portion of the vessel separate from said stripped catalyst, and means for evacuating the precipitated fines from said selected portion.

10. Apparatus of claim 9 wherein the disengager conduits are notched on the side facing the axis of the vessel so as to direct the conversion gases downwardly and toward the center of the vessel.

11. Apparatus of claim 9 wherein the disengager conduits are notched on the side adjacent the vessel wall and at a sufficient angle therefrom so as to impart to the gaseous mixture in said vapor space a swirling motion around the inner surface of said wall.

12. In a vertically elongated hydrocarbon conversion vessel having means for admitting catalyst and feedstock to the upper portion of the vessel for concurrent flow therethrough, means for withdrawing catalyst particles from the base thereof into a standpipe, a grid plate positioned at an intermediate level in the vessel and forming a horizontal partition therein, an effluent pipe extending into the space below said grid plate and through the vessel wall for discharge of gases therefrom, a cylindrical hopper with a frusto-conical base positioned below said effluent pipe and separated therefrom, a second hopper of the same shape but of lesser diameter nested within the first hopper and concentric therewith, a series of vertical partitions spaced at regular intervals throughout the annular space separating the two hoppers, thereby dividing this space into a plurality of open ended cells, a shelf projecting inwardly from the inner wall of the outer hopper and substantially narrowing the cross sectional area of the cells at that level, a plurality of catalyst downcomers extending downwardly through the grid plate and into the cells, one to each cell, a stripper conduit extending from outside the vessel through the wall thereof and through the wall of the outer hopper and projecting into the empty space under the shelf, said empty space thereby serving as a header for the injection of stripping gas into said cells for passage upwardly therethrough, said standpipe connected to the base of the outer hopper and extending through the base of the vessel for the withdrawal of stripped catalyst particles from the bases of the cells, a plurality of hydrocarbon vapor disengagers extending downwardly through said grid plate and terminating within the vapor space below adjacent the effluent pipe, said disengagers being hooded over their upper ends to deflect catalyst particles, in combination, means defining notches at the lower ends of said disengagers, said notches adapted to direct the vapor discharge therefrom at a predetermined angle with respect to the pheriphery of said vapor space toward a selected point whereby said vapor discharge can drive the fines entrained in the stripping gases into a selected locale of said reactor removed from said annular space, and an eductor pipe extending from said selected locale through the vessel wall for the discharge of accumulated catalyst fines.

13. Apparatus of claim 12 where said selected locale is said inner hopper.

14. Apparatus of claim 12 wherein selected locale is the space surrounding the outer hopper.

References Cited in the file of this patent

UNITED STATES PATENTS

| | | |
|---|---|---|
| 2,326,438 | Clarke | Aug. 10, 1943 |
| 2,380,324 | Munday | Jul. 10, 1945 |
| 2,458,498 | Bergstrom | Jan. 11, 1949 |
| 2,461,104 | Bates | Feb. 8, 1949 |
| 2,531,356 | Evans | Nov. 21, 1950 |
| 2,542,887 | Watson | Feb. 20, 1951 |
| 2,546,625 | Bergstrom | Mar. 27, 1951 |
| 2,695,265 | Degnen | Nov. 23, 1954 |